Feb. 28, 1950     P. H. CARNELL     2,498,789
RECOVERY OF HYDROGEN FLUORIDE
Filed May 20, 1946
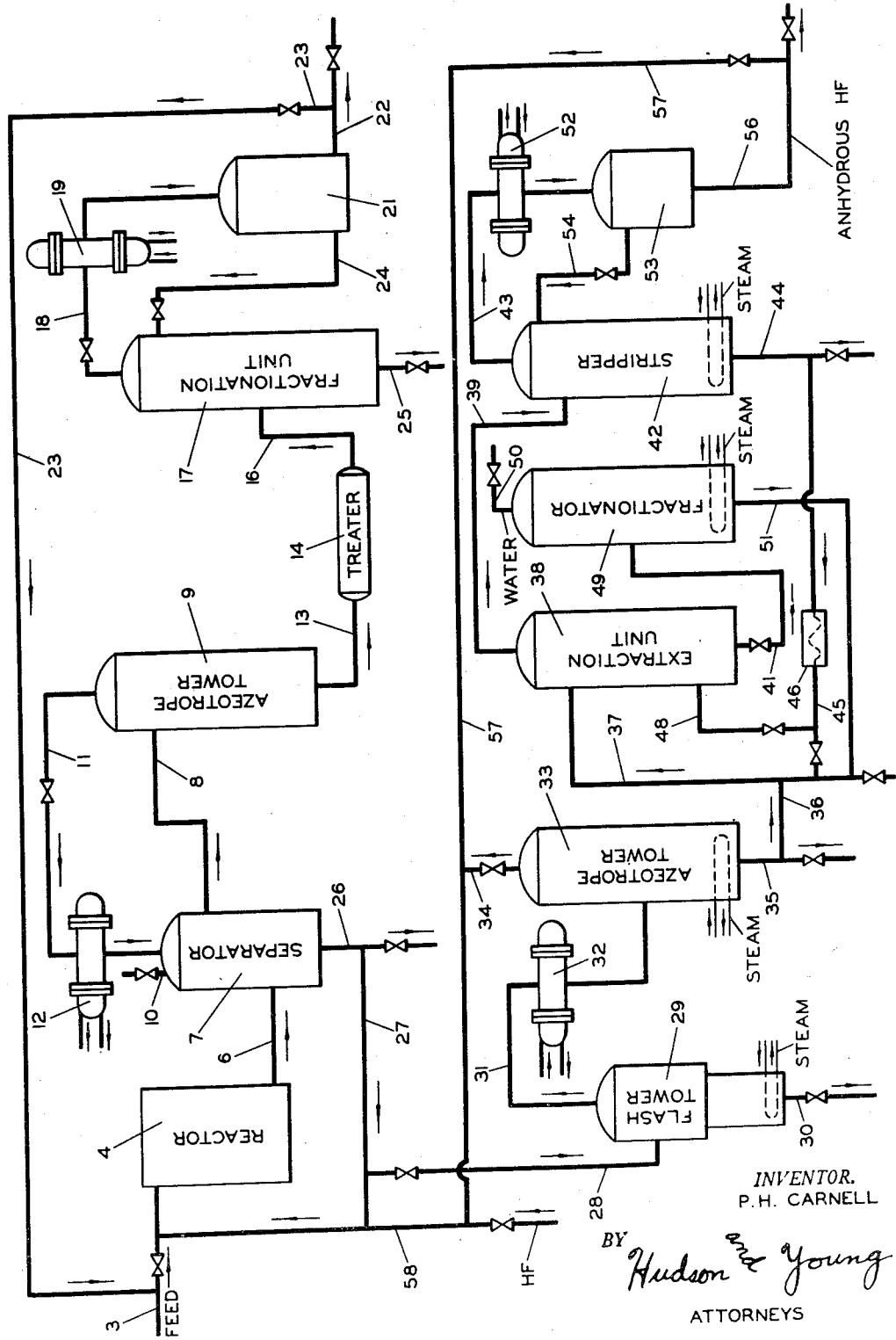
INVENTOR.
P. H. CARNELL
BY Hudson and Young
ATTORNEYS Patented Feb. 28, 1950

2,498,789

UNITED STATES PATENT OFFICE 2,498,789

RECOVERY OF HYDROGEN FLUORIDE

Paul H. Carnell, Bartlesville, Okla., assignor to Phillips Petroleum Company, a corporation of Delaware Application May 20, 1946, Serial No. 671,111

5 Claims. (Cl. 260—683.4)

This invention relates to the recovery of hydrogen fluoride. In one embodiment this invention relates to the recovery of anhydrous hydrogen fluoride from an azeotropic mixture with water. In another embodiment this invention relates to the conversion of hydrocarbons in the presence of a hydrofluoric acid-containing catalyst.

The requirement for substantially anhydrous hydrogen fluoride has been increased in recent years because of its use in the anhydrous condition as a catalyst in promoting and economically effecting certain types of hydrocarbon conversions. For examples, anhydrous or highly concentrated hydrogen fluoride is used as a catalyst in the conversion of hydrocarbons by alkylation, isomerization, cracking, cyclization and aromatization; as a reactant in production of alkyl fluorides; and as a scrubbing agent for selective solvents in the removal of certain impurities from saturated hydrocarbons.

In hydrocarbon conversion processes, the hydrocarbon to be converted is contacted, usually in the liquid phase, with concentrated hydrofluoric acid which is usually present as a separate liquid phase. During the conversion process, the titratable acidity of the acid phase decreases as a consequence of dilution with organic by-products and with water which is brought into the process with the reacting materials. In certain processes, such as paraffin-olefin alkylation, part of the diluent water is probably formed by corrosion of containing equipment by the hydrofluoric acid, whereas, in other processes, such as alkylation of paraffins or of aromatics with alcohols, water is a by-product of the hydrocarbon conversion process. It is desirable to maintain the titratable acidity relatively high in many hydrocarbon conversion processes in which hydrofluoric acid is used as a catalyst. For example, in hydrofluoric acid alkylation of paraffins with olefins, it is desirable to maintain a titratable acidity of 80 to 95 weight per cent in the acid phase. Acidity is maintained in this range by addition of fresh acid and withdrawal of used acid.

Hydrogen fluoride is manufactured at a temperature of 300° F. to 400° F. by the reaction between calcium fluoride and sulphuric acid, followed by subsequent distillation which produces a product containing some water. As in the case of hydrocarbon conversion processes using hydrogen fluoride, it is very difficult, yet essential, to free the hydrogen fluoride of water acquired during its manufacture.

To a certain extent water can be removed from a mixture of hydrogen fluoride and water by distillation and in some cases by electrolysis. It is also possible to add such chemicals as caustic soda or lime which combine with the hydrogen fluoride, and subsequently the hydrogen fluoride is reliberated by a strong acid to obtain a substantially anhydrous product. Such processes of freeing the hydrogen fluoride of water are, however, relatively expensive and often not reliable. For example, in the conversion of hydrocarbons in the presence of hydrogen fluoride, the hydrogen fluoride is recovered in a series of fractional distillation steps which ultimately result in the formation of an azeotropic mixture of water with a portion of the hydrogen fluoride. Because of the extreme difficulty in separating the remaining hydrogen fluoride from this azeotropic mixture, the azeotropic mixture is usually discarded with the resulting loss of the hydrogen fluoride contained therein and also with the resulting dangers to human health accompanying its disposal. This azeotropic mixture, which is a maximum boiling solution, contains approximately 37 to 38 weight per cent of hydrogen fluoride.

Since in commercial processes for the conversion of hydrocarbons the loss of hydrogen fluoride is significant, a method for substantially complete recovery of highly concentrated or anhydrous fluoride is much to be desired. Furthermore, certain concentrations of hydrogen fluoride and water are very corrosive to various types of construction materials. Consequently, a method to control and minimize the percentage of water in the hydrofluoric acid throughout a conversion process would simplify the construction of process equipment. In this respect, copper and Monel metal and a few others can be used over a relatively large range of concentrations of water in hydrofluoric acid; however, if the concentration of water could be maintained less than about 20 per cent throughout the process, the use of steel and cast iron would be possible.

The object of this invention is to recover concentrated hydrogen fluoride from an admixture with other materials.

Another object of this invention is to recover highly concentrated, or anhydrous, hydrogen fluoride from an azeotropic mixture of hydrogen fluoride and water.

Still another object is to recover substantially anhydrous hydrogen fluoride from an admixture of hydrogen fluoride with hydrocarbons.

Another object is to maintain substantially water-free hydrogen fluoride having noncorrosive effects on steel and cast iron in hydrocarbon conversion processes.

Another object is to decrease the cost of hydrogen fluoride recovery and make-up in hydrocarbon conversion processes.

Other objects and advantages of the present invention will become apparent to those skilled in the art from the accompanying disclosure and description.

According to this invention, highly concentrated, or even anhydrous, hydrogen fluoride is recovered from an aqueous mixture containing the same by treatment with a liquid hydrocarbon solution comprising a cycloolefin. When the aqueous mixture containing the hydrogen fluoride contacts the cycloolefin, an organic fluoride is formed. The organic fluoride is relatively immiscible with a liquid aqueous mixture. In this manner hydrogen fluoride is extracted from the aqueous mixture. Thereafter, a resulting liquid organic solution containing the organic fluoride is heated to a temperature sufficiently high to dissociate hydrogen fluoride from the organic fluoride. Hydrogen fluoride thus liberated is recovered as a concentrated, and sometimes as an anhydrous, product and the resulting cycloolefin is returned to the process for reuse.

Preferably after extraction, the dissociation of the organic fluoride, such as a cycloalkyl fluoride, to release hydrogen fluoride is accomplished by charging the resulting liquid organic solution containing the cycloalkyl fluoride and any unreacted cycloolefin to a conventional stripping column under conditions of temperature and pressure necessary to decompose or strip the cycloalkyl fluoride. Hydrogen fluoride is removed as an overhead fraction from this column, and a liquid hydrocarbon solution comprising a cycloolefin is removed as a bottom product from the column, which product is recycled to the extraction process.

The extraction of hydrogen fluoride from the aqueous mixture is accomplished by contacting the hydrocarbon solution in the liquid phase with the water-hydrogen fluoride mixture in either the liquid or vapor phase at somewhat higher than atmospheric temperature. The extraction process may be carried out in either a batchwise or continuous process; if a continuous extraction process is used, it is preferable to pass the aqueous mixture and the hydrocarbon solution countercurrently to each other in a liquid-liquid extraction.

The temperature of the aqueous solution in a liquid-liquid extraction, generally, should be as low as practicable for optimum extraction of the hydrogen fluoride. The extraction step is preferably effected at a temperature between about 120 and about 390° F. and, generally, at sufficient pressure to maintain the cycloolefin in the liquid state. Suitable conditions in any particular instance can be readily found by simple experiments by one skilled in the art, in accordance with the present disclosure.

Where it is found particularly suitable, a liquid-vapor extraction or absorption of the hydrogen fluoride from a vapor phase mixture of water and hydrogen fluoride may be carried out with comparative ease at temperatures above about 230° F. when the boiling temperature of the cycloolefin is above that of the aqueous solution. Preferably, the hydrogen fluoride absorption is accomplished by countercurrent flow of the liquid hydrocarbon solution with a vapor phase mixture of the water and hydrogen fluoride having a superheat not more than about 50° F.

The chemical nature of the extraction step of the process in which the hydrogen fluoride is removed from the aqueous mixture by the cycloolefin constitutes a chemical interaction between the cycloolefin itself and the hydrogen fluoride whereby probably the corresponding cycloalkyl fluoride is formed. At least a molecular equivalent of cycloolefin to hydrogen fluoride is used, preferably the cycloolefin is in excess of the hydrogen fluoride present in the aqueous mixture.

The stripping step of the process liberates hydrogen fluoride from the organic solution from the extraction step and may be carried out in a conventional stripping column. The temperature of the stripping step, depending upon the pressure therein, is relatively higher than the temperature of the extraction step. Temperatures between about 200 and about 500° F., with the corresponding pressure required to maintain the cycloolefin in the liquid phase, are suitable to decompose or strip the cycloalkyl fluoride to liberate hydrogen fluoride therefrom. It may be preferable to use other temperatures than within this range since ultimately the required temperature for decomposition or stripping depends upon the thermal stability of the cycloalkyl fluoride and the bubble point temperatures of the organic mixture in the stripping column.

Compounds which have been found particularly satisfactory and preferable for extracting the hydrogen fluoride from an aqueous mixture include cyclopentene, cyclohexene, and cycloheptene. It has been found that suitable cycloolefins comprise mono-cycloolefins containing more than 3 and less than 8 carbon atoms per molecule in the ring. These are, however, only a few of the many cycloolefins which may be used with satisfactory results, and the invention is not limited to the use of these particular compounds but includes the use of these cycloolefins with saturated side chains and other cycloolefins.

The accompanying drawing is a diagrammatic illustration of apparatus in which an embodiment of the present invention may be carried out when applied to the alkylation of an alkylatable hydrocarbon, such as isobutane, with an olefin in the presence of hydrogen fluoride as the catalyst. A suitable and typical feed stock for hydrogen fluoride alkylation appears in Table I below:

*Table I*

| Component | Mol per cent |
|---|---|
| Isubutane | 68 |
| Isobutylene | 4 |
| Normal butylene | 7 |
| Butane | 20 |
| Other hydrocarbons | 1 |
| | 100 |

Such a hydrocarbon feed enters reactor 4 through inlet 3 and is intimately contacted with hydrofluoric acid, which enters through line 58 and which has a titratable acidity of about 80 to about 95 weight per cent. The overall mol ratio of isoparaffin to olefin is usually from about 4:1 to about 20:1 in the combined feed and recycle, and much higher in the reaction zone. The time of residence of the reaction mixture in the reactor 4 is usually from about 5 to about 15 minutes, but it may be shorter or longer as desired. The volume ratio of acid to hydrocarbon is between approximately 0.5:1 and approximately 2:1, generally about 1:1; although other ratios may be maintained. The hydrocarbon feed stock enters the alkylation process through line 3 and passes to reactor 4 as a liquid at a temperature of about 50° F. to about 150° F. and a pressure of about 25 to about 100 pounds per square inch gage. Should it be desired, however, both higher pressures and higher temperatures may be used. In general, only sufficient pressure to assure liquid phase operation is necessary.

From reactor 4, a hydrocarbon conversion effluent is passed by line 6 to separator 7 in which the effluent separates into two liquid phases, a hydrocarbon-rich phase and a heavier liquid hydrogen fluoride-rich phase. The hydrogen fluoride-rich phase is withdrawn from the bottom of separator 7 through line 26 to be recycled as a catalyst for the alkylation reaction by passing from line 26 through line 27 to line 58 and thence to reactor 4. It may be desirable to remove water from the hydrogen fluoride and for this purpose a portion or all of the hydrogen fluoride-rich phase is passed through a purification system, the operation of which will be discussed completely hereinafter.

The liquid hydrocarbon-rich phase containing some dissolved hydrogen fluoride passes from separator 7 to azeotrope tower 9 by line 8. Separation of an azeotropic mixture of low-boiling hydrocarbons and hydrogen fluoride from the hydrocarbon-rich phase is effected in tower 9. This azeotropic mixture passes as a vapor from tower 9 through line 11 and condenser 12 to separator 7. A liquid hydrocarbon stream substantially free from hydrogen fluoride but containing small amounts of organic fluorine compounds, passes from the bottom of tower 9 through line 13 to treater 14. These organic fluorine compounds, which are formed as by-products of the hydrocarbon conversion, are removed by treatment with a suitable agent, such as bauxite or alumina, in treater 14.

The liquid hydrocarbon stream, now substantially free from organic fluorine compounds, passes through line 16 to fractionation unit 17, which may represent either a single deisobutanizer or a series of fractionators, for the separation of various components of the hydrocarbon conversion effluent. This liquid hydrocarbon stream which constitutes the hydrocarbon conversion effluent has approximately the following composition at this point in the process shown in Table II below.

*Table II*

| Hydrocarbon component | Mol per cent |
| --- | --- |
| Propane and lighter hydrocarbons | 1 |
| Isobutane | 57 |
| Normal butane | 20 |
| Alkylate | 22 |
|  | 100 |

In case fractionator 17 is a deisobutanizer, normal butane and heavier hydrocarbons are separated from isobutane and lighter hydrocarbons therein. The overhead fraction containing the isobutane and lighter hydrocarbons is passed by line 18 and through condenser 19 to accumulator 21. A portion of the condensed overhead fraction is recycled to fractionator 17 through line 24 as a liquid reflux.

The isobutane may be separated from the lighter hydrocarbons through further treatment (not shown) or a portion or all of the overhead product after condensation may be recycled from accumulator 21 to reactor 4 by lines 22 and 23, particularly when the proportion of propane and lighter hydrocarbons is relatively so small that the pressure limitations of the subsequent separator is not exceeded. Unrecycled condensate may be withdrawn through line 22.

Butane and heavier hydrocarbons, including the alkylation products, are withdrawn from fractionator 17 by line 25 and are conveyed to subsequent fractionators (not shown) for separation of the alkylation products from the butane and other materials as desired.

Line 10 on separator 7 is a vent for the removal of propane and lighter hydrocarbons from the system and serves also to maintain the required pressure limitations on the process equipment.

The hydrogen fluoride-rich phase from separator 7 will accumulate sufficient water, because of its continuous recycle to reactor 4, to decrease the catalytic activity of the hydrogen fluoride and also to acquire corrosive characteristics toward the iron or steel process equipment which it contacts. It is, therefore, desirable to remove water from at least a portion of the hydrogen fluoride before it is recycled to reactor 4. All or a portion of the hydrogen fluoride phase from separator 7 is passed to flash tower 29 via lines 26, 27 and 28 as the first step in recovery of anhydrous, or more highly concentrated, hydrogen fluoride.

Flash tower 29 effects a separation of the hydrogen fluoride-rich phase from separator 7 into a purified hydrogen fluoride fraction, which is taken overhead through line 31 and condenser 32 to azeotrope tower 33; and a hydrocarbon fraction, consisting essentially of heavy polymers which contaminated the hydrogen fluoride-rich phase, the latter fraction being withdrawn from the bottom of flash tower 29 through line 30 for disposal or further processing. A small amount of light hydrocarbons may also be carried overhead with the purified hydrogen fluoride.

In azeotrope tower 33, any water that is present in the hydrogen fluoride is removed by line 35 as a maximum boiling mixture of water and hydrogen fluoride. Anhydrous hydrogen fluoride is withdrawn overhead from azeotrope tower 33 through line 34 into line 57 after which it is recycled to reactor 4 via line 58. Make-up hydrogen fluoride may be added to the alkylation system through line 58 when necessary.

Any danger of an azeotropic mixture of hydrogen fluoride and water, which might be corrosive to the construction material, accumulating in flash tower 29 is eliminated by maintaining the top temperature of the flash tower 29 sufficiently high to ensure that water is carried overhead. The azeotropic mixture referred to boils at approximately 232° F. at atmospheric pressure, and at a higher temperature under superatmospheric pressures.

In order to recover the hydrogen fluoride contained in the liquid azeotropic mixture which is removed from the bottom of azeotropic tower 33 rather than discard the mixture which would amount to a substantial economic loss of hydrogen fluoride, the mixture is passed from tower 33 through lines 35 and 36, and if desired through a cooler (not shown) into line 37 where it combines and is intimately mixed by a pump or mixer (not shown) with a liquid solution comprising cyclohexene. The mol ratio of hydrogen fluoride in the aqueous solution to cycloolefin admixed at this point is preferably about 1 to about 2, but the mol ratio may vary from about 1 to 1 to about 1 to 20 with substantially complete extraction of the hydrogen fluoride occurring.

The resulting liquid mixture formed in line 37 is passed into extracting unit 38 which may comprise a vertical column. The aqueous solution with some unextracted hydrogen fluoride passes down the column 38 and liquid water, substantially free of hydrogen fluoride, is discharged therefrom through line 41 and may be discarded (not shown). Because of the relative densities of the aqueous solution and hydrocarbon solution, the liquid water will separate from the organic mixture of cycloolefin and alkyl fluoride and continuously flow downward through column 38. A liquid organic solution containing hydrogen fluoride, probably in the form of the cycloalkyl fluoride, is passed to stripping unit 42 through line 39.

The aqueous solution and hydrocarbon solution are admixed at a temperature between about 120 and about 390° F., preferably between about 150 and about 200° F., in the extracting unit 38 by cooling units or the like (not shown) located in line 37 or in column 38 itself. Pressure is maintained moderately superatmospheric.

The temperature is maintained sufficiently high in stripping unit 42 to decompose or strip the cycloalkyl fluoride in order to liberate hydrogen fluoride. The temperature is preferably maintained between about 200 and about 500° F., preferably between about 215 and about 250° F., and sufficient pressure is maintained to prevent extensive vaporization of the cycloolefin or organic fluoride. In general, the pressure of the stripping unit is relatively lower than the pressure of the extracting unit to ensure more complete stripping therein. If necessary, a small amount of free hydrogen fluoride may be introduced into the organic solution in stripper 42 to catalyze the decomposition reaction.

The hydrocarbon solution comprising cyclohexene which is substantially free of hydrogen fluoride, is removed from the stripping unit by line 44.

The stream, removed from the bottom of unit 42 through line 44, is passed through line 45 and cooler 46 into line 37 for the initial reaction between the cycloolefin and the hydrogen fluoride. Additional cyclohexene may be added to the system through line 37. A portion or even all of the cycloolefin stream from stripper 42 may be passed directly to the lower portion of extraction unit 38 through line 48. Because of the relative densities of the hydrocarbon stream introduced through line 48 and the aqueous solution, the hydrocarbon stream flows upward in column 38 countercurrently to the downward flowing aqueous solution. The countercurrent flow of the cycloolefin stream and aqueous solution ensures substantially complete removal of hydrogen fluoride by extraction. This hydrocarbon stream combines with the organic stream entering column 38 through line 37 and both are removed therefrom through line 39 as previously described.

Hydrogen fluoride which has dissociated from the cycloalkyl fluoride is distilled overhead from stripping unit 42 and is removed therefrom by line 43. A portion of the cycloolefin may also pass overhead. Hydrogen fluoride and any hydrocarbons present pass through condenser 52 to accumulator or decanter 53. Condensed hydrocarbons and condensed hydrogen fluoride separate into two liquid phases in accumulator 53, a liquid hydrocarbon-rich phase and a heavier liquid hydrogen fluoride-rich phase. The hydrocarbon-rich phase is withdrawn through line 54 and returned to stripping unit 42 as a liquid reflux. The second or hydrogen fluoride-rich phase is withdrawn from accumulator 53 through line 56 as an anhydrous hydrogen fluoride product or may be returned to the reactor 4 as a catalyst via lines 57 and 58.

The hydrogen fluoride contains substantially no water and is about 99.5 per cent pure.

The aqueous solution discharged from the lower portion of column 38 through line 41 may and often does contain a substantial amount of hydrogen fluoride, enough to warrant reconcentration of the aqueous solution to approximately the azeotropic composition and its subsequent return to column 38 to recover the hydrogen fluoride therefrom. Therefore, the aqueous stream is passed from column 38 through line 41 to fractionator 49. In fractionator 49, water is removed as an overhead product through line 50 and an azeotropic mixture of hydrogen fluoride and water is removed through line 51 and recycled to line 37, as shown.

*Example*

The following is an example of an application of the present invention to the removal of hydrogen fluoride from an aqueous solution containing the same and is not considered to unduly limit the invention. An 800 milliliter bomb or chamber of Monel metal was charged with 520 grams of 50 per cent aqueous hydrogen fluoride solution and 45 grams of cyclohexene. The bomb was clamped to a platform rocker and was fitted with a suitable pressure gage. The bomb was slowly heated to a temperature of about 240° F. over a period of about 50 minutes, during which period the contents of the bomb were agitated by rocking. The maximum pressure in the bomb was about 50 pounds per square inch gage. The bomb was cooled and the contents thereof removed. The remaining unreacted free hydrogen fluoride in the water phase from the bomb was neutralized with potassium hydroxide. A liquid organic phase from the bomb, which had separated from the liquid water phase, was distilled. Free hydrogen fluoride passed overhead during the distillation as a result of the decomposition of the cycloalkyl fluoride and the hydrogen fluoride was recovered. The remaining kettle product of the distillation boiled below about 190° F., with the exception of a small amount of polymer formed during the treatment. Practically no free hydrogen fluoride remained in the aqueous phase after contact with the cycloolefin. This polymer, after separation from the cycloolefin by distillation, is heated further to liberate any hydrogen fluoride retained in it. The resulting material left after the heating treatment of the polymer is a high molecular weight oil having good drying oil properties useful in paints and varnishes. The exact composition of the drying oil is not known but it is highly unsaturated and boils above about 190° F.

Aliphatic olefins, as well as cycloolefins, may be employed to extract hydrogen fluoride from an aqueous solution according to this invention, but cycloolefins are much preferred because cycloalkyl fluorides, unlike aliphatic fluorides, do not readily hydrolyze to the alcohols in the presence of aqueous hydrogen fluoride.

Although the invention has been described with reference to a hydrocarbon conversion process carried out in a particular manner, various modifications and other applications will occur to those

I claim:

1. In a process for the alkylation of an alkylatable hydrocarbon in the presence of hydrogen fluoride in which a hydrocarbon conversion effluent is separated into a liquid hydrocarbon-rich phase and a heavier liquid hydrogen fluoride-rich phase and said liquid hydrogen fluoride-rich phase is distilled into an overhead fraction comprising substantially anhydrous hydrogen fluoride and a bottom fraction comprising a liquid mixture of water and hydrogen fluoride, the improvement which comprises continuously passing said liquid bottom fraction of hydrogen fluoride and water into contact with a liquid cycloolefin in an extraction zone under conditions such that said hydrogen fluoride is bound as an organic fluoride and extracted from said liquid bottom fraction, maintaining a mol ratio of cycloolefin to hydrogen fluoride in said extraction zone of at least about 1:1, maintaining a temperature in said extraction zone between about 120 and about 390° F., separating a resulting liquid organic solution containing organic fluoride and a resulting aqueous mixture from said extraction zone, passing said resulting aqueous mixture to a distillation zone and distilling the same therein, removing from said distillation zone water as an overhead product and a more concentrated mixture of hydrogen fluoride and water as a bottom product, recirculating said concentrated mixture of hydrogen fluoride and water from said distillation zone to said extraction zone, passing said resulting liquid organic solution to a stripping zone under conditions such that substantially anhydrous hydrogen fluoride is removed therefrom as an overhead product and a liquid cycloolefin is removed as a bottom product, maintaining a temperature in said stripping zone between about 200 and about 500° F. and sufficient pressure to substantially prevent the vaporization of a cycloolefin, recycling said liquid cycloolefin from said stripping zone to said extraction zone, and recycling said overhead product of hydrogen fluoride to the alkylation reaction.

2. The process for the production of a drying oil which comprises contacting an aqueous solution of hydrogen fluoride with a cycloolefin having not less than 4 and not more than 7 carbon atoms per molecule in the ring under conditions such that an organic fluoride is formed, separating the organic fluoride from a resulting mixture, heating said organic fluoride under conditions such that said organic fluoride is decomposed into a vaporous fraction comprising hydrogen fluoride and a liquid fraction comprising hydrocarbons, and recovering a drying oil from said liquid hydrocarbon fraction by distillation.

3. In a process for the conversion of a hydrocarbon in the presence of hydrogen fluoride in which a hydrocarbon conversion effluent is separated into a liquid hydrocarbon-rich phase and a heavier liquid hydrogen fluoride-rich phase and said liquid hydrogen fluoride-rich phase is distilled into an overhead fraction comprising substantially anhydrous hydrogen fluoride and a bottom fraction comprising a liquid mixture of water and hydrogen fluoride, the improvement which comprises continuously passing said liquid bottom fraction of hydrogen fluoride and water into contact with a liquid cycloolefin in an extraction zone under conditions such that said hydrogen fluoride is bound as an organic fluoride and extracted from said liquid bottom fraction, separating a resulting liquid organic solution containing organic fluoride and a resulting aqueous mixture from said extraction zone, passing said resulting aqueous mixture to a distillation zone and distilling the same therein, removing from said distillation zone water as an overhead product and a more concentrated mixture of hydrogen fluoride and water as a bottom product, recirculating said concentrated mixture of hydrogen fluoride and water from said distillation zone to said extraction zone, passing said resulting liquid organic solution to a stripping zone under conditions such that substantially anhydrous hydrogen fluoride is removed therefrom as an overhead product and a liquid cycloolefin is removed as a bottom product, recycling said liquid cycloolefin from said stripping zone to said extraction zone, and recycling said overhead product of hydrogen fluoride to the conversion reaction.

4. The process of claim 3 in which the temperature in said stripping zone is maintained between about 200° and about 500° F. and under sufficient pressure to prevent the vaporization of said cycloolefin.

5. The process of claim 1 wherein said cycloolefin is cyclohexene.

PAUL H. CARNELL.

REFERENCES CITED

The following references are of record in the file of this patent:

UNITED STATES PATENTS

| Number | Name | Date |
| --- | --- | --- |
| 2,220,713 | Grosse et al. | Nov. 5, 1940 |
| 2,354,554 | Showalter | July 25, 1944 |
| 2,371,341 | Matuszak | Mar. 13, 1945 |
| 2,388,156 | Kelley | Oct. 30, 1945 |

OTHER REFERENCES

McElvain et al., Chemical Abstracts, vol. 39, page 282 (1945).